(12) United States Patent
Foukas et al.

(10) Patent No.: US 12,096,270 B2
(45) Date of Patent: Sep. 17, 2024

(54) ANOMALY DETECTION FOR VIRTUALIZED RANS

(71) Applicant: Microsoft Technology Licensing, LLC, Redmond, WA (US)

(72) Inventors: Xenofon Foukas, Cambridge (GB); Zhehui Zhang, Redmond, WA (US); Bozidar Radunovic, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 17/578,008

(22) Filed: Jan. 18, 2022

(65) Prior Publication Data
US 2023/0136356 A1 May 4, 2023

Related U.S. Application Data

(60) Provisional application No. 63/275,919, filed on Nov. 4, 2021.

(51) Int. Cl.
*H04W 28/02* (2009.01)
*H04W 88/18* (2009.01)

(52) U.S. Cl.
CPC ... *H04W 28/0242* (2013.01); *H04W 28/0205* (2013.01); *H04W 28/0247* (2013.01); *H04W 88/18* (2013.01)

(58) Field of Classification Search
None
See application file for complete search history.

(56) References Cited

U.S. PATENT DOCUMENTS

| 11,032,135 B2 | 6/2021 | Abu Lebdeh et al. |
| 2020/0162315 A1* | 5/2020 | Siddiqi ................. H04W 24/04 |

(Continued)

FOREIGN PATENT DOCUMENTS

| EP | 3720051 A1 | 10/2020 |
| WO | 2020049346 A1 | 3/2020 |

OTHER PUBLICATIONS

"Network Function Virtualization (NFV) Architecture", Retrieved from: https://www.techplayon.com/network-function-virtualization-nfv-architecture/, Aug. 8, 2017, 10 Pages.

(Continued)

*Primary Examiner* — Kenny S Lin

(57) ABSTRACT

To meet the stringent 5G radio access network (RAN) service requirements, layers one and two need to be processed in essentially real time. Thus, prompt anomaly detection is important to prevent negative impacts on customer experience, which is critical for mobile networks to meet the stringent service requirements. However, monitoring networks for anomalies is difficult due at least to (1) the resource constrained edge deployments in which the vRAN resides, (2) the variety of anomaly types and fault locations making anomalies difficult to detect, and (3) the low frequency of anomalies leading to unbalanced data sets for training, among others. The present application addresses these issues by decoupling anomaly detection at the infrastructure layer (servers, NICs, switches, etc.) from anomaly detection at the VNF layer (L1, high-DU, CU). This enables different techniques for identifying anomalies and for reducing the monitoring overhead that is tailored to each layer.

16 Claims, 9 Drawing Sheets

(56) References Cited

U.S. PATENT DOCUMENTS

| | | | |
|---|---|---|---|
| 2020/0267057 A1 | 8/2020 | Garvey et al. | |
| 2021/0334673 A1 | 10/2021 | Butvinik | |
| 2022/0255817 A1* | 8/2022 | Hong | H04L 41/046 |

OTHER PUBLICATIONS

Diamanti, et al., "LSTM-based Radiography for Anomaly Detection in Softwarized Infrastructures", In Proceedings of the International Teletraffic Congress, Sep. 22, 2020, 10 Pages.

Hong, et al., "Machine Learning based SLA-Aware VNF Anomaly Detection for Virtual Network Management", In Proceedings of the International Conference on Network and Service Management, Nov. 2, 2020, 7 Pages.

Martins, et al., "Physical Layer Anomaly Detection Mechanisms in IoT Networks", In Proceedings of the NOMS 2020-2020 IEEE/IFIP Network Operations and Management Symposium, Apr. 20, 2020, 9 Pages.

Santos, et al., "When 5G Meets Deep Learning: A Systematic Review", In Journal of the Algorithms, vol. 13, Issue 9, Aug. 25, 2020, pp. 1-34.

Sauvanaud, et al., "Towards Black-Box Anomaly Detection in Virtual Network Functions", In Proceedings of the IEEE/IFIP International Conference on Dependable Systems and Networks Workshop, Jun. 28, 2016, 5 Pages.

Trakadas, et al., "Hybrid Clouds for Data-Intensive, 5G-Enabled IoT Applications: An Overview, Key Issues and Relevant Architecture", In Journal of the Sensors, vol. 19, Issue 16, Aug. 17, 2019, 19 Pages.

"International Search Report and Written Opinion issued in PCT Application No. PCT/US2022/040825", Mailed Date: Feb. 16, 2023, 28 Pages.

"Invitation to Pay Additional Fees Issued in PCT Application No. PCT/US22/040825", Mailed Date: Dec. 23, 2022, 7 Pages.

Soenen, et al., "Empowering Network Service Developers: Enhanced NFV DevOps and Programmable MANO", In Proceedings of IEEE Communications Magazine, vol. 57, Issue 5, May 13, 2019, pp. 89-95.

* cited by examiner

ANOMALY DETECTION FOR VIRTUALIZED RANS

CROSS-REFERENCE TO RELATED APPLICATIONS

This application claims the benefit of priority to U.S. Provisional Application No. 63/275,919, entitled "Anomaly Detection for Virtualized RANs," filed Nov. 4, 2021, the entire disclosure of which is hereby incorporated by reference herein in its entirety.

BACKGROUND

Demand for integration between a cloud network and a radio access network (RAN) and/or a core network for wireless telecommunications has rapidly increased. The RAN provides wireless connectivity to mobile computing devices by converting radio signals into data packets. The core network coordinates among various parts of the RAN and provides connectivity to a packet-based network (e.g., the Internet). Traditional wireless telecommunications deployed servers with hardware that was specialized to particular types of processing and was typically built with a capacity to accommodate an estimated peak load of the network traffic. Use of cloud network technology, particularly virtual server technologies, has enabled decoupling of at least some wireless data processing from specialized hardware onto general-purpose servers.

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized datacenters to the network edge, closer to end users. MEC provides low latency, high bandwidth, and real-time access to RAN information.

The cloud RAN for 5G comprises a distributed architecture including a Radio Unit (RU) at one or more cell towers and cloud servers at the network edge associated with one or more of a Distributed Unit (DU), a Central Unit (CU), and a RAN Intelligent Controller (RIC). The DU is associated with network switches and processes data in a series of operations associated with at least layer one (i.e., the "PHY" or physical layer) and layer two (the "MAC" or data link layer) of the Open Systems Interconnection (OSI) model. Distributing computing power enables the high volume of 5G devices and facilitates disaggregated, virtualized RANs (vRANs) to create additional access points. Virtualized Network Functions (VNF) replace hardware-based functions like firewalls, load balancers, and routers with virtualized instances that run as software. Enhanced Common Public Radio Interface (eCPRI) can be used, for instance, for the front-haul interface of a cloud RAN (e.g., for the real-time processing by the distributed unit (DU)).

As will be discussed further below, anomaly detection is a critical task for network management in virtualized mobile networks. By detecting anomalies, engineers are able to troubleshoot the abnormal behaviors of the system. Prompt anomaly detection mitigates and even prevents negative impacts on customer experiences, which is critical for mobile networks to meet the stringent service requirements noted above. Unlike 4G networks based on monolithic specialized hardware boxes, 5G and beyond networks rely on virtualized functions running on commodity hardware. However, this introduces more complexity due to disaggregated network functions, multiple software vendors and the complicated supporting infrastructure.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

As described further herein, there are several challenges for anomaly detection in the vRAN. First, monitoring features for all network functions and the infrastructure is costly. As an example, in a commercial-grade testbed, the overhead to collect features for a single cell can take more than 70% cycles of a single central processing unit (CPU) core. The overhead could further increase due to network function colocation. For example, monitoring features for ten vRAN cells collocated on a single server could take several CPU cores. In the resource constrained edge deployments in which the vRAN resides, such monitoring is impractical if not impossible. Furthermore, for some of the vRAN functions (e.g. the DU), the monitoring overhead could directly impact the performance of the network (e.g. due to the DU violating scheduling and processing deadlines).

Second, anomalies appearing in the network may not be well-known or easily recognized and can change based on the deployment scenario. For example, interference at the CPU level might affect the network differently depending on the vRAN vendor's VNF design (e.g. number of threads, thread synchronization model, memory accesses, etc.). This can vary substantially across different vendors. Similarly, anomalies might manifest in different combinations at various locations of the network (e.g. packet loss between the DU and the CU along with wireless interference, CPU interference at the DU with packet loss at the CU, etc.).

Third, anomalies appearing in the network rarely occur (<1% of use cases), resulting in data collected from the live network being heavily skewed towards non-anomalous cases. Therefore, training models with both anomalous and non-anomalous instances is usually not an option. Generating synthetic anomalies to create balanced datasets is also not an option, given the unknown nature and combinations of manifested anomalies as stated in the second challenge.

According to the present disclosure, the above and other issues are resolved by decoupling anomaly detection at the infrastructure layer (servers, NICs, switches, etc.) from that at the VNF layer (L1, high-DU, CU). This enables application of different techniques for identifying anomalies and for reducing the monitoring overhead that is tailored to each domain. More specifically, models are trained for VNF anomaly detection and, separately, for infrastructure anomaly detection. A VNF anomaly detection model is trained based on non-anomalous VNF behavior in two phases, the first phase based on training data collected in a controlled environment and the second phase based on training data collected in a production environment. Additionally, an infrastructure anomaly detection model is trained based on event data collected for various resources by monitoring functions. Sampling frequencies associated with the monitoring functions may be adjusted to reduce monitoring overhead while still accurately training the infrastructure anomaly detection model.

In an aspect, a system including at least one processor and memory storing instructions that, when executed by the at least one processor, cause the system to perform operations for anomaly detection in a radio access network (RAN). The operations include collecting controlled data associated with a virtualized network function (VNF) in a controlled environment of a RAN datacenter, where the VNF is non-anomalous in the controlled environment. Based on the controlled data, the operations include defining a model for a non-anomalous VNF including a set of inputs and a set of probabilistic outputs. Additionally, the operations include collecting at least one sample of production data associated with the VNF in a production environment of a RAN datacenter, wherein the VNF is one of anomalous or non-anomalous in the production environment and, based on the defined model, determining whether the at least one sample of production data is associated with the non-anomalous VNF. When the at least one sample of production data is associated with the non-anomalous VNF, the operations include training the model with the at least one sample of production data and, based on the trained model, detecting an anomaly associated with the VNF during runtime in the RAN datacenter, where the anomaly is associated with an observed output that differs from a probabilistic output of the trained model by more than a threshold amount.

In another aspect, a method for detecting anomalies in a radio access network (RAN) is provided. The method includes profiling a baseline scheduling latency offline for an operating system (OS) platform of a RAN datacenter, loading at least one monitoring function for the OS platform, and profiling a monitoring scheduling latency offline for the operating system (OS) platform loaded with the at least one monitoring function. Additionally, the method includes determining an overhead associated with the at least one monitoring function, where the overhead is a difference between the baseline scheduling latency and the monitoring scheduling latency; and adjusting a sampling frequency for the at least one monitoring function to reduce the overhead. Based on data collected by the at least one monitoring function, the method includes training a model to detect an anomaly associated with an infrastructure of the RAN datacenter and, based on the trained model, detecting one or more anomalies associated with the infrastructure of the RAN datacenter.

In yet another aspect, a method for detecting anomalies in a radio access network (RAN) is provided. The method includes collecting controlled data associated with a virtualized network function (VNF) in a controlled environment, wherein the VNF is non-anomalous in the controlled environment and, based on the controlled data, defining a model for the non-anomalous VNF including a set of inputs and a set of probabilistic outputs. The method further includes collecting at least one sample of production data associated with the VNF in a production environment of a RAN datacenter, where the VNF is one of anomalous or non-anomalous in the production environment, and determining that the at least one sample of production data is associated with the non-anomalous VNF when the model predicts that the at least one sample of production data includes a percentage of non-anomalous data above a threshold percentage. When the at least one sample of production data is associated with the non-anomalous VNF, the method includes training the model with the at least one sample of production data and, based on the trained model, detecting an anomaly associated with the VNF during runtime in the RAN datacenter, where the anomaly is associated with an observed output that differs from a probabilistic output of the trained model by more than a threshold amount.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
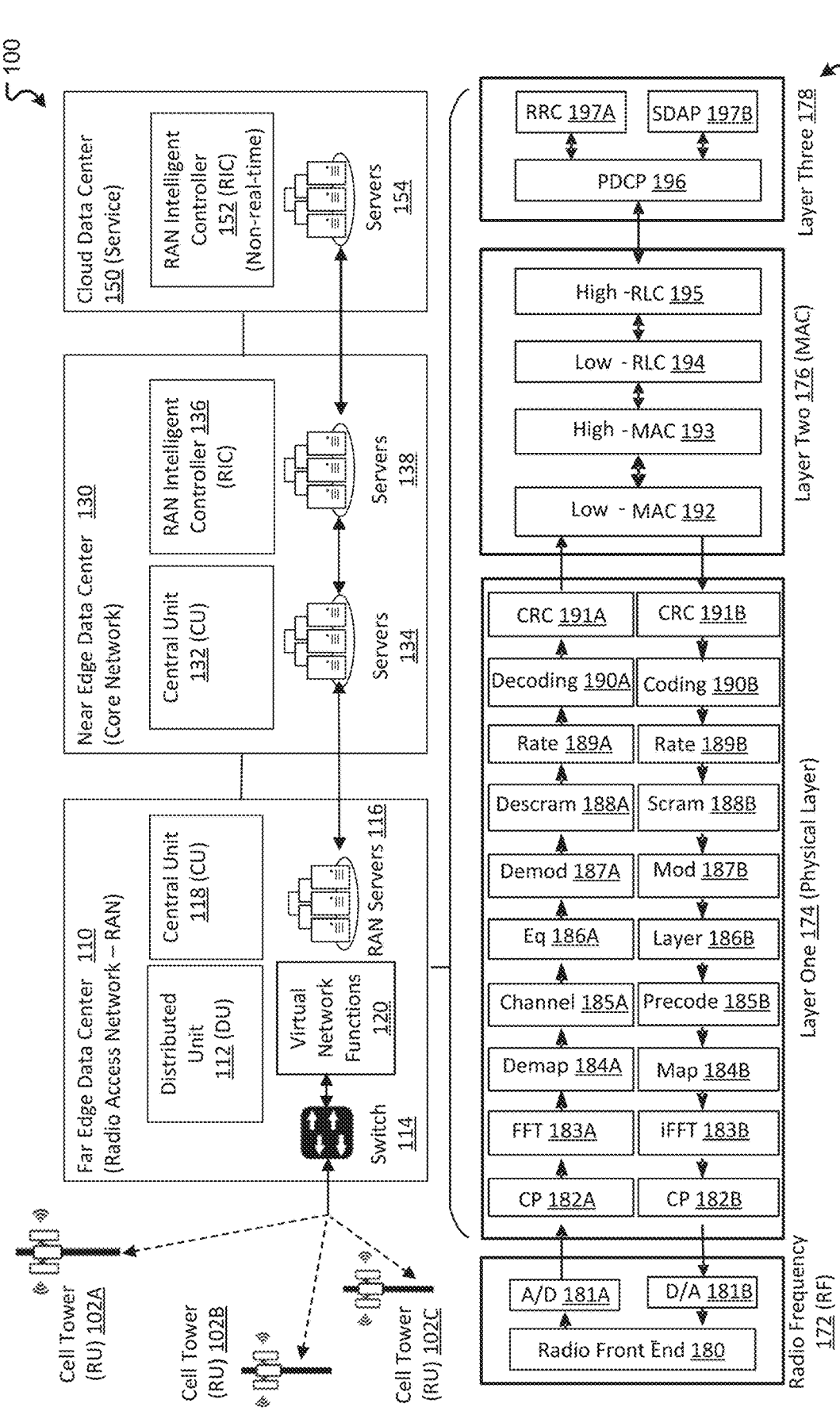
FIG. 1 illustrates an overview of an example system implementing a cloud RAN in accordance with aspects of the present disclosure.

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

As described above, 5G specifications outline a host of performance requirements related to bandwidth, peak data rate, energy efficiency, reliability, latency (both user-plane and control-plane latency), traffic capacity, etc. To meet 5G requirements, layers one and two need to be processed in essentially real time. Thus, prompt anomaly detection is important to prevent negative impacts on customer experience, which is critical for mobile networks to meet these stringent service requirements. However, monitoring networks for anomalies is difficult due to (1) the resource constrained edge deployments in which the vRAN resides, (2) the variety of anomaly types and fault locations making anomalies difficult to detect, and (3) the low frequency of anomalies leading to unbalanced data sets for training, to name a few. The present application addresses these issues by decoupling anomaly detection at the infrastructure layer (servers, NICs, switches, etc.) from anomaly detection at the VNF layer (L1, high-DU, CU). This enables different techniques for identifying anomalies and for reducing the monitoring overhead that is tailored to each layer.

In aspects, multiple benefits are realized by the anomaly detection methods disclosed herein. For instance, a lightweight anomaly detection design is disclosed that is specifically tailored to the vRAN environment. The design minimizes the number and sampling frequency of the monitored features of the vRAN VNFs and the vRAN infrastructure, ensuring that the real-time performance of the vRAN is not affected and the data collection overhead at the far-edge remains minimal. The lightweight design is achieved (1) by employing an offline learning approach and a supervised feature selection approach using data collected offline by profiling the vRAN functions, (2) by offloading monitoring functions to programmable edge switches whenever possible, and (3) by introducing a sampling technique at the infrastructure level to ensure that the monitoring functions do not adversely impact the real-time performance of the vRAN VNFs. Additionally, an unsupervised training method is disclosed that allows online training to be performed in an automated way, without requiring prior knowledge of the type of collected online data (anomalous, non-anomalous). Thus, the proposed model can be fine-tuned for each deployment scenario.

FIG. 1 illustrates an overview of an example vRAN system 100 in which learning-based anomaly detection may be implemented in accordance with the aspects of the present disclosure. Cell towers 102A-C transmit and receive wireless communications with mobile computing devices (e.g., smartphones) over a radio access network (RAN). The example system 100 further includes far-edge datacenter 110 (switches, RAN servers), near-edge datacenter 130 (core network servers), and cloud datacenter 150 (cloud services). In aspects, the example system 100 corresponds to a cloud RAN infrastructure for a mobile wireless telecommunication network.

The far-edge datacenter 110 is a datacenter that is part of the cloud RAN, which includes distributed unit 112 (DU) and central unit 118 (CU). In other aspects, the far-edge datacenter 110 may also include a RAN intelligent controller (RIC) (not shown). In aspects, the far-edge datacenter 110 enables cloud integration with a radio access network (RAN). The far-edge datacenter 110 includes a switch 114 and RAN servers 116 configured to host vRAN instances 120 for processing RAN data. A virtual RAN (or "vRAN") is a type of RAN in which networking functions (including the control and data planes) are separated from the hardware that hosts the vRAN (e.g., RAN server(s) 116). In general, virtualized network functionalization (VNF) involves enabling software to perform hardware-based functions, which enables increased responsiveness to network fluctuations and increased flexibility for enhancements since software can be upgraded or repaired more easily than hardware.

The switch 114 and the RAN servers 116 process incoming data traffic and outgoing data traffic associated with layer one (L1) 174 and at least a part of layer two (L2) 176. In aspects, the far-edge datacenter 110 is generally geographically remote from the cloud datacenters associated with the core network and cloud services. The remote site is in proximity to the cell towers 102A-C. For example, the proximity in the present disclosure may be within a same organization campus or within a few kilometers in aspects. Upstream data traffic may correspond to data flowing from the cell towers 102A-C to servers 154 in the cloud datacenter 150. Similarly, the downstream data traffic corresponds to data flowing from the cloud datacenter 150 to the cell towers 102A-C.

The near-edge datacenter 130 (e.g., hosting the core network) may include a central unit 132 (CU) and RAN intelligent controller 136 (RIC) (near real-time processing, which may be less strictly time-sensitive than real-time processing). As illustrated, CU 132 is associated with servers 134 and RIC 136 is associated with servers 138. In aspects, the near-edge datacenter 130 is at a regional site of a private cloud service. For example, the regional site may be about tens of kilometers from the cell towers 102A-C.

The cloud datacenter 150 includes RIC 152 associated with servers 154. For example, RIC 152 may process non-real-time service operations. In aspects, the cloud datacenter 150 may be at a central location in a cloud RAN infrastructure. For example, the central locations may be hundreds of kilometers from the cell towers 102A-C.

In aspects, the far-edge datacenter 110, which is closer to the cell towers 102A-C than the cloud datacenter 150, provides at least some real-time processing. In contrast, the cloud datacenter 150, which is the furthest from the cell towers 102A-C in the cloud RAN infrastructure, may provide processing that is not limited by RAN guidelines (e.g., non-real-time processing).

The operational partitions 170 illustrate various operational segments for processing data traffic in the RAN. For example, the operational partitions 182-191 may correspond to layer one 174 processing and operational partitions 192-195 may correspond to layer two 176 processing of the OSI seven-layer model. In some aspects, anomalies may occur in the operational partitions of layer one 174 and layer two 176.

In aspects, conversion of data associated with a radio frequency 172 (RF) occurs prior to processing data at layer one 174. For radio frequency 172 (RF) data processing, the radio front-end partition receives and sends data through the cell towers 102A-C to mobile computing devices over wireless communications. The A/D 181A converts analog data from the radio front-end to digital data for the upstream data traffic. The D/A 181B converts digital data into analog data for the downstream data traffic. In aspects, the interface between DU and RU in a cloud RAN is referred to as "Fronthaul." The Fronthaul defines a number of "planes" of operations, including the "c-plane" (control plane), the "u-plane" (user plane), the "s-plane" (synchronization plane), and the "m-plane" (management plane). In general, c-plane data is directed to scheduling and coordination of data transmission, u-plane data is directed to efficient data transfer (e.g., defined by 5G specifications), s-plane data is directed to timing and synchronization of data transmission between RU and DU, and m-plane data relates to managing the RU. Packets having data payloads related to the different planes of operation comprise corresponding header information, e.g. a "c-plane header," "u-plane header," etc.

Partitions in layer one 174 (physical layer) may be associated with operations for converting coded symbols associated with a bit stream into a physical signal for transmission using communication media (e.g., a physical wire or radio). In aspects, the operational partitions for processing upstream data traffic of the physical layer may include, CP 182A, FFT 183A, Demap 184A, Channel 185A, Eq 186A, Demod 187A, Descram 188A, Rate 189A, Decoding 190A, and CRC 191A. The operational partitions for processing downstream data traffic in the physical layer may include, for example, CRC 191B, Coding 190B, Rate 189B, Scram 188B, Mod 187B, Layer 186B, Precode 185B, Map 184B, iFFT 183B, and CP 182B.

Partitions in layer two 176 (media access control—MAC) may be associated with operations for transferring data frames between network hosts over a physical link. In aspects, partitions in layer two 176 correspond to the data link layer in the OSI seven-layer model. Low-MAC 192 is the lowest partition in the layer two 176. Other partitions above the Low-MAC 192 include, an ascending sequence of layers, High-MAC 193, Low-Radio Link Control (RLC) 194, and High-RLC 195.

Partitions in the layer three 178 may be associated with operations for forwarding data packets through routers. In aspects, layer three 178 corresponds to the network layer in the OSI seven-layer model. The partitions in layer three 178 may be associated with protocol-governed operations such as Packet Data Convergence Protocol 196 (PDCP), Radio Resource Control 197A (RRC) and Service Data Adaptation Protocol 197B (SDAP).

In aspects, a combination of DU 112 and CU 118 in the far-edge datacenter 110 may process partitions associated with layer one 174, layer two 176, and at least a part of layer three 178. In particular, respective servers of RAN servers 116 include central processors (CPUs) and a variety of accelerators for processing data associated with one or more partitions of the operational partitions 170.

As previously noted, to meet 5G requirements, layers one and two need to be processed in essentially real time. In particular, steering workloads in a correct and timely manner is critical in the RAN in various scenarios including server failover and maintenance. For example, RAN workloads may include processing IQ samples from cell towers. Quadrature signals, also called IQ signals, IQ data or IQ samples, are often used in radio frequency (RF) applications, such as a RAN. IQ samples form the basis of complex RF signal modulation and demodulation, both in hardware and in software, as well as in complex signal analysis. To facilitate transmission of this type of data, IQ samples are often compressed and are transmitted via u-plane data packets with corresponding u-plane headers. Again, this type of RAN data may require real-time processing to meet latency and other performance metrics of 5G.

FIG. 1 illustrates many of the complexities of cloud RAN system, including complexities in hardware, software, and the local- and wide-area networks interconnecting the various components and data centers. Not only so, but far-edge data center 110 often has physical constraints as a result of its geographic proximity to the cell towers 102A-C. That is, the far-edge data center 110 may be constrained by the physical space available to implement the hardware infrastructure, resulting in reduced memory and computing power available for processing and data storage. Paired with the RAN requirements for real-time processing, resource constraints can greatly limit the amount and type of processing that can be performed at the far edge. That is, processing and memory directed to operations tangential to RAN processing, such as anomaly detection, are greatly limited. The present disclosure addresses this issue by decoupling anomaly detection at the infrastructure layer (servers, NICs, switches, etc.) from that at the VNF layer (L1, high-DU, CU). This enables application of different techniques for identifying anomalies and for reducing the monitoring overhead that is tailored to each domain.

As will be appreciated, the various methods, devices, applications, features, etc., described with respect to FIG. 1 are not intended to limit the system 100 to being performed by the particular hardware and/or software described. Accordingly, additional controller configurations may be used to practice the methods and systems herein and/or features and applications described may be excluded without departing from the methods and systems disclosed herein.

Figure 2:
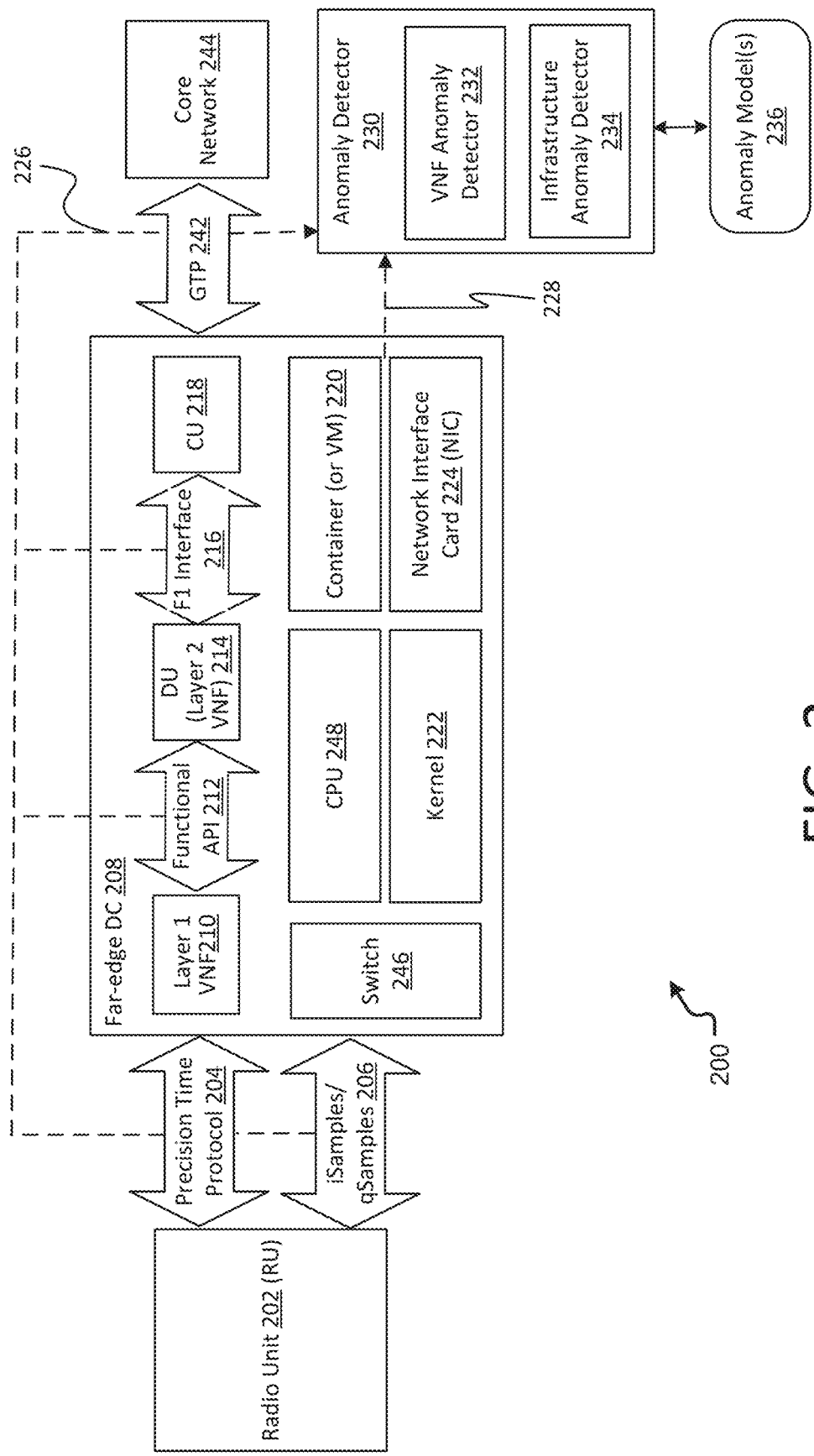
FIG. 2 illustrates an overview of an example far-edge datacenter of a RAN environment for performing anomaly detection in accordance with aspects of the present disclosure.

FIG. 2 illustrates an overview of an example far-edge datacenter (DC) 208 in RAN environment 200 for performing anomaly detection in accordance to aspects of the present disclosure. As illustrated, the far-edge datacenter 208 may include at least CPU 248, container(s) (or virtual machine(s) (VM)) 220, a kernel 222, and a network interface card (NIC) 224. The far-edge datacenter 208 performs VNF packet processing operations at least at L1 210, high-DU 214 (including at least layer two), and CU 218. Interfaces, such as functional application programming interface (FAPI) 212 and F1 interface 216, may enable data transfer/manipulation across the various layers. Although not shown, the far-edge datacenter 208 may include additional or alternative hardware components, including various processors, removable or non-removable storage, interfaces, etc. The far-edge datacenter 208 communicates with at least one RU 202 at a cell tower (e.g., cell towers 102A-C, as shown in FIG. 1), for instance, using a precision time protocol (PTP) 204 (e.g., for clock synchronization), and receives and transmits IQ samples 206. In aspects, switch 246 may be located in the path from the RU to the far-edge datacenter 208 and may forward packets transmitted from the RU to hardware associated with the far-edge datacenter 208, such as CPU 248, container(s) (or VM(s)) 220, kernel 222, and/or NIC 224. Additionally, far-edge datacenter 208 may communicate with the core network 244 (e.g., hosted by near-edge datacenter 130, as shown in FIG. 1) using the GPRS Tunneling Protocol (GTP) 242.

In aspects, far-edge datacenter 208 may further comprise or communicate with anomaly detector 230. Anomaly detector 230 may receive data from various components or interfaces associated with the far-edge datacenter 208. For instance, VNF data 226 may be collected by monitoring various network functions, protocols and/or interfaces, such as PTP 204, FAPI 221, F1 interface 216, and GTP 242. In aspects, the VNF 226 may include packet/state statistics collected by intercepting packets exchanged between network functions and extracting a packet state. Additionally, infrastructure data 228 may be collected by monitoring resources, such as VM(s) 220, kernel 222, NIC 224, etc., to determine resource utilization statistics. The VNF data 226 and the infrastructure data 228 may be received by anomaly detector 230, which comprises a VNF anomaly detector 232 and an infrastructure anomaly detector 234. The anomaly detector 230 may further comprise or communicate with anomaly model(s) 236. Although the far-edge datacenter 208 is illustrated and described, the system is not so limited. For example, the anomaly detector 230 may communicate with other components and/or datacenters associated with the RAN infrastructure, such as the RU 202 and/or a near-edge datacenter (e.g., near-edge datacenter 130 of FIG. 1).

As will be appreciated, the various methods, devices, applications, features, etc., described with respect to FIG. 2 are not intended to limit the system 200 to being performed by the particular hardware and/or software described. Accordingly, additional controller configurations may be used to practice the methods and systems herein and/or features and applications described may be excluded without departing from the methods and systems disclosed herein.

Figure 3:
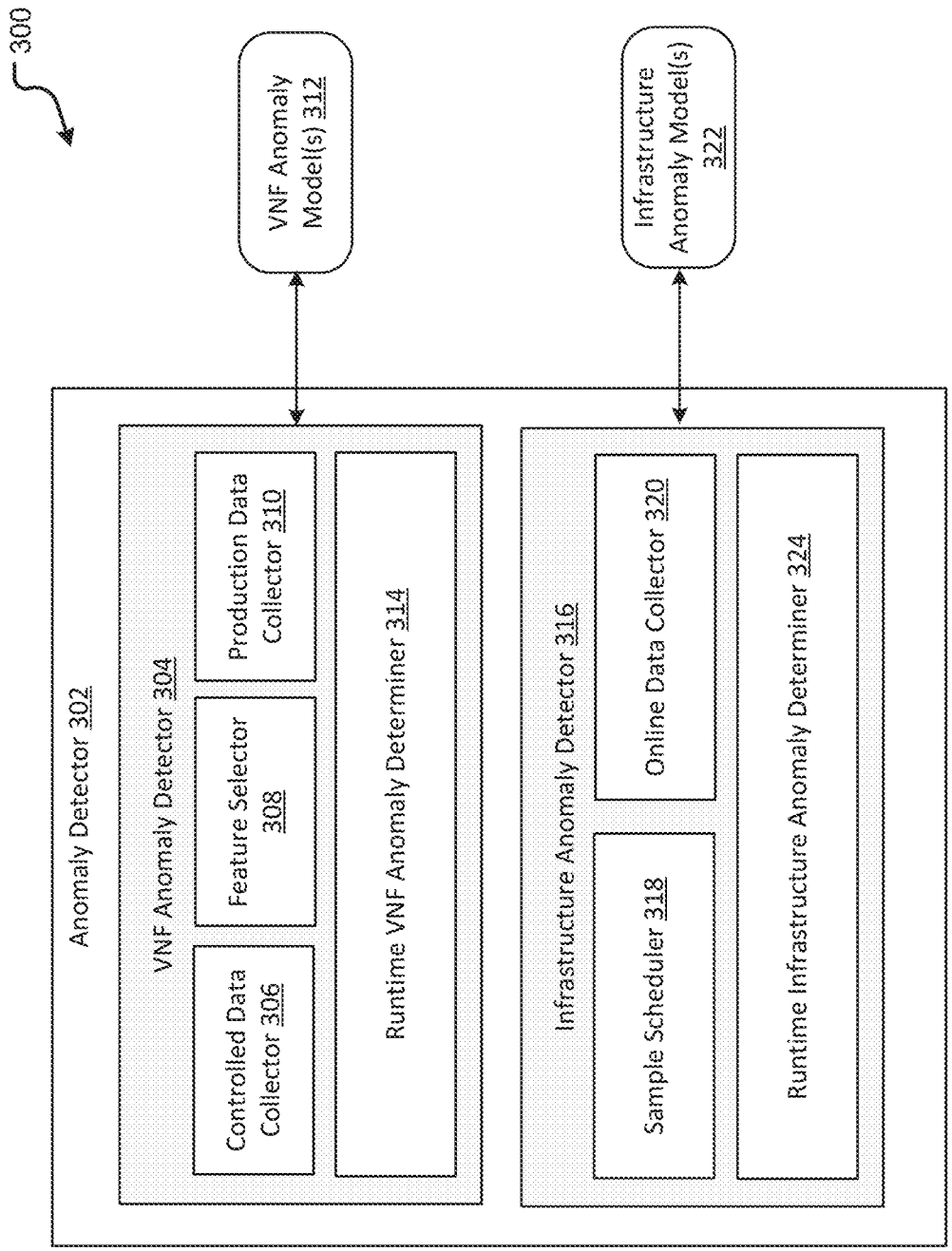
FIG. 3 illustrates an overview of an example anomaly detector of a far-edge datacenter for performing anomaly detection in accordance with aspects of the present disclosure.

FIG. 3 illustrates an overview of an example anomaly detector of a far-edge datacenter for performing anomaly detection in accordance to aspects of the present disclosure.

As noted above, in order to facilitate anomaly detection in a RAN environment, the present application decouples anomaly detection at the infrastructure layer (servers, NICs, switches, etc.) from that at the VNF layer (L1, high-DU, CU). As illustrated, anomaly detector 302 comprises a VNF anomaly detector 304 and an infrastructure anomaly detector 316. In aspects, anomaly detector 302 may be the same as or similar to anomaly detector 230 of FIG. 2.

VNF anomaly detector 304 may comprise controlled data collector 306, feature selector 308, production data collector 310, and runtime VNF anomaly determiner 314. The VNF anomaly detector 304 may further comprise or communicate with VNF anomaly model(s) 312. Infrastructure anomaly detector 316 may comprise sample scheduler 318, online data collector 320, and runtime infrastructure anomaly determiner 324. Infrastructure anomaly detector 316 may further comprise or communicate with infrastructure anomaly model(s) 322.

In aspects, VNF anomaly detector 304 may be responsible for anomaly detection at the VNF layer. For instance, each network function can be viewed as a finite state machine that takes certain inputs and, given its state, produces certain probabilistic outputs. For example, the L1 VNF may take as an input FAPI messages from the high-DU and IQ samples from an RU (e.g. using the xRAN protocol). Based on those, it produces a set of output FAPI messages for the high-DU and output IQ samples for the RU. The CU and the DU also present a similar behavior. Based on collecting data from each of the VNFs, a model for each VNF may be trained for anomaly detection. The collected data could include, among others, the inputs/outputs of the VNFs as described above (messages for FAPI, xRAN, F1, GTP, etc), as well as data about the state of the VNFs (e.g. buffer sizes at the MAC and RLC layer for the DU and at the PDCP layer for the CU, timers, etc.). In aspects, the models are trained based on data (e.g., features) collected in non-anomalous cases. The trained models may then be used to detect anomalies, by inferring the predicted output of the VNFs given some new input. If the distance of the predicted from the observed output is above a threshold for a window of data (e.g. last 20 collected points), this can be identified as an anomaly.

To reduce the monitoring overhead and to improve the accuracy of the VNF anomaly detection models, the training can be broken into two phases. In the first phase, controlled data collector 306 may collect training data in a controlled environment (ensuring no anomalies are present) to provide broad coverage of supported vRAN use cases, such as a number of mobile devices (e.g., user equipment, UEs), traffic patterns, signal quality fluctuations, etc. In aspects, the controlled environment may be a testbed deployment with a small number of cells that can be manually checked to ensure no anomalies are present, or a deployment with a CU/DU/L1 tester. Using the collected training data from the controlled environment, learning techniques can be applied to predict the behavior of the VNFs for non-anomalous cases. Such learning techniques could include supervised learning, where a model is fit to predict the VNF's output given its input and state, or unsupervised learning, such as generative models (e.g., auto-encoders), where the VNF's' input, output, and state are used as input training features. As part of this training, feature selector 308 may perform supervised feature selection to minimize the monitoring overhead, which is critical for the real-time operation of the RAN, without significant loss in the prediction accuracy. VNF anomaly models 312 may then be trained for the selected features based on the collected data from the controlled environment.

In the second phase of the training, the pre-trained VNF anomaly models 312 from the first phase can be continuously trained with data collected in a production environment by production data collector 310. To reduce the VNF monitoring overhead in the production environment, programmable switches can be used to capture VNF input/output data and to maintain counters about packets whenever possible (e.g., by using P4 codelets), including the collection of full xRAN and F1 messages, counters about GTP-U messages (e.g., inter-packet delay), etc. In the production environment, however, there is no guarantee that anomalies are not present. Accordingly, it must be determined whether data collected from the production environment can be trusted as non-anomalous training data. In a first aspect, the data may be collected online during windows of a fixed duration (e.g., 20 seconds). The data for a whole window can then be used as input to the existing trained VNF anomaly model 312 to infer whether the data is anomalous or not. When the VNF anomaly model 312 predicts with high certainty that the percentage of non-anomalous data in the window is above a threshold (e.g., 60%), all collected data in the window can be treated as non-anomalous and can be used to further train the VNF anomaly model 312. Alternatively, if the percentage of the non-anomalous data is below the threshold, the collected data can be discarded as anomalous. In a second aspect, collected data may be manually marked offline by domain experts as non-anomalous and the VNF anomaly model 312 may be retrained with the modified dataset (in a backtracking fashion). The second aspect can be useful in cases where the automated online training method erroneously marked anomalous data as non-anomalous, leading to noise in training the VNF anomaly model 312 and, thus, to reduced accuracy. Trained VNF anomaly model(s) 312 may then be used by runtime VNF anomaly determiner 314 to detect anomalies at a far-edge datacenter of a vRAN environment.

In aspects, infrastructure anomaly detector 316 may perform anomaly detection at the infrastructure layer. In this case, online data collector 320 can collect data from the platform/OS level, including but not limited to NIC, switch packet counters (e.g., packet losses, number of packets, etc.), CPU core utilization, number of interrupts, kernel lock latency, per-thread VNF stats (CPU scheduling latency, CPU on-off times, context switches, cache miss ratio, DRAM accesses, etc.). In aspects, an unsupervised time-series anomaly detection approach may use generative models (e.g. autoencoder) and training of infrastructure anomaly model(s) 322 can be performed online at the production network. For infrastructure monitoring, the largest overhead is due to the large number of events that occur in certain monitoring sources (e.g., CPU scheduling latency, per process off-CPU times, and cache reads/misses). Given the real-time nature of the vRAN processing, such monitoring overhead can adversely impact the performance of the RAN VNFs. Therefore, sample scheduler 318 may perform a sampling technique to collect data from the infrastructure layer.

More specifically, to ensure that infrastructure monitoring does not interfere with the real-time requirements of the vRAN VNFs, sample scheduler 318 may implement the following safeguards:

(1) Scheduling latency of the OS platform to be monitored may be profiled offline using platform tests, including the minimum, maximum and average scheduling latency for each CPU core of the system.

(2) Loading the monitoring functions of interest (e.g., CPU scheduling latency, per process off-CPU times, and cache reads/misses) and repeating the above process of measuring the min, max, average scheduling latency. In this case, the measurements include both the baseline overhead of (1) and the overhead introduced by the monitoring functions themselves.

(3) Based on the results obtained from (1) and (2), sample scheduler 318 may adjust the sampling frequency for each of the monitoring functions (1 out of every N events) to ensure that the total scheduling latency overhead from the introduction of the monitoring functions remains below some threshold. For example, the sampling frequency of the monitoring functions can be adjusted so that the average scheduling latency per CPU core does not increase by more than 10% compared to the non-monitoring case. In this case, the scheduling latency is the sum of the baseline scheduling latency of (1) plus the sampling overhead for collecting 1/N samples, which is reduced proportionally as compared to (2) to the sampling frequency.

(4) Deploying the monitoring functions on the production environment using the sampling parameters obtained during the offline profiling phase (1)-(3).

Trained infrastructure anomaly model(s) 322 may then be used by runtime infrastructure anomaly determiner 324 to detect anomalies at a far-edge datacenter of a vRAN environment.

In aspects, multiple benefits are realized by the anomaly detection methods disclosed herein. For instance, a lightweight anomaly detection design is disclosed that is specifically tailored to the vRAN environment. The design minimizes the number and sampling frequency of the monitored features of the vRAN VNFs and the vRAN infrastructure, ensuring that the real-time performance of the vRAN is not affected and the data collection overhead at the far-edge remains minimal. The lightweight design is achieved (1) by employing an offline learning approach and a supervised feature selection approach using data collected offline by profiling the vRAN functions, (2) by offloading monitoring functions to programmable edge switches whenever possible, and (3) by introducing a sampling technique at the infrastructure level to ensure that the monitoring functions do not adversely impact the real-time performance of the vRAN VNFs. Additionally, an unsupervised training method is disclosed that allows online training to be performed in an automated way, without requiring prior knowledge of the type of collected online data (anomalous, non-anomalous). Thus, the proposed model can be fine-tuned for each deployment scenario.

As will be appreciated, the various methods, devices, applications, features, etc., described with respect to FIG. 3 are not intended to limit the system 200 to being performed by the particular hardware and/or software described. Accordingly, additional controller configurations may be used to practice the methods and systems herein and/or features and applications described may be excluded without departing from the methods and systems disclosed herein.

Figure 4:
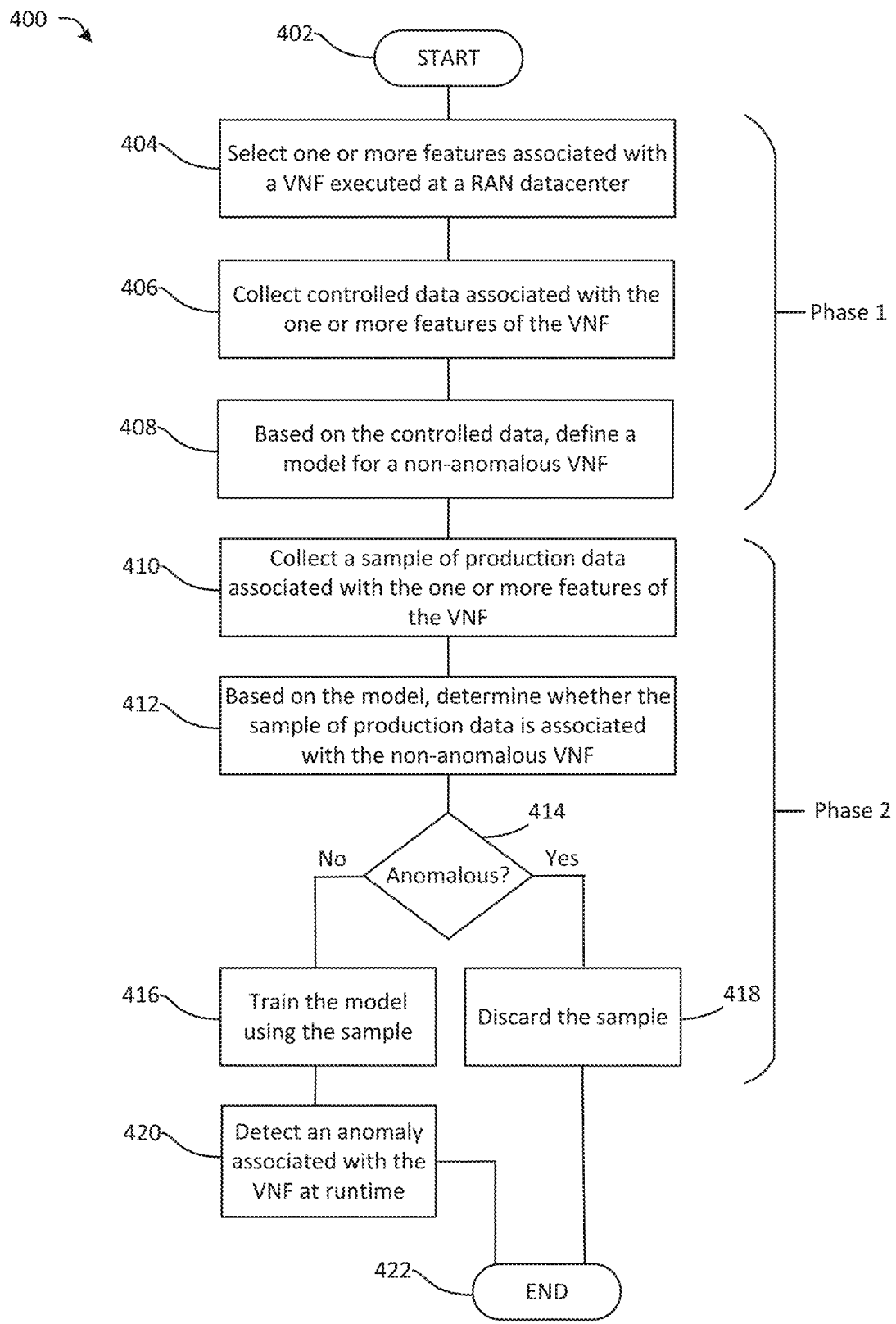
FIG. 4 illustrates an example method for detecting an anomaly associated with a virtualized network function (VNF) at a RAN datacenter in accordance with aspects of the present disclosure.

FIG. 4 illustrates an example method for detecting an anomaly associated with a virtualized network function (VNF) at a RAN datacenter in accordance with aspects of the present disclosure. A general order of the operations for the method 400 is shown in FIG. 4. Generally, the method 400 begins with start operation 402 and ends with end operation 422. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device.

Following start operation 402, at select operation 404, one or more features associated with a virtualized network function (VNF) executed at a RAN datacenter may be selected. In aspects, the one or more features may be selected to minimize a monitoring overhead for detecting anomalies associated with the VNF while maximizing an accuracy of detected anomalies associated with the VNF. In some examples, select operation 404 may occur after collect controlled data operation 406 and/or after define model operation 408. In other examples, select operation 404 may not be necessary for detecting an anomaly associated with the VNF but may be implemented to limit monitoring overhead for the anomaly detection.

At collect controlled data operation 406, controlled data associated with the VNF (or the one or more features associated with the VNF) may be collected in a controlled environment. In aspects, the controlled environment may be a testbed deployment with a small number of cells that can be manually checked to ensure no anomalies are present, or a deployment with a CU/DU/L1 tester. Since the controlled data is collected in the controlled environment, this ensures that no anomalies are present and provides broad coverage of supported vRAN use cases, such as a number of mobile devices (e.g., user equipment, UEs), traffic patterns, signal quality fluctuations, etc.

At define operation 408, a model for the non-anomalous VNF may be defined based on the controlled data. For instance, each VNF can be viewed as a finite state machine that takes certain inputs and, given its state, produces certain probabilistic outputs. Using the controlled data, learning techniques can be applied to predict the behavior of the VNF for non-anomalous cases. Such learning techniques could include supervised learning, where a model is fit to predict the VNF's output given its input and state, or unsupervised learning, such as generative models (e.g., auto-encoders), where the VNF's input, output, and state are used as input training features. As part of this training, supervised feature selection may be performed to minimize the monitoring overhead, which is critical for the real-time operation of the RAN, without significant loss in the prediction accuracy. In this case, the model can be trained for the selected features based on the controlled data.

In aspects, operations 404-408 may be associated with a first phase of training a model for VNF anomaly detection.

At collect production data operation 410, at least one sample of production data associated with the VNF may be collected in a production environment. To reduce the VNF monitoring overhead in the production environment, programmable switches can be used to capture VNF input/output data and to maintain counters about packets whenever possible.

At determine operation 412, based on the model, it may be determined whether the at least one sample of production data is associated with the non-anomalous VNF. That is, in the production environment there is no guarantee that anomalies are not present. Accordingly, it must be determined whether data collected from the production environment can be trusted as non-anomalous training data. In a first aspect, the production data may be collected online during windows of a fixed duration (e.g., 20 seconds). The production data for a whole window (e.g., the at least one sample) can then be used as input to the existing trained model to infer whether the sample of production data is anomalous or not. When the existing model predicts with high certainty that the percentage of non-anomalous data in the sample is above a threshold (e.g., 60%), all production data in the sample can be treated as non-anomalous and can be used to further train the model. In a second aspect, the production data may be manually marked offline by domain experts as non-anomalous and the model may be retrained with the modified production data.

At decision operation 414, if the at least one sample of production data is non-anomalous, the method may progress to train operation 416. Alternatively, at decision operation 414, if the at least one sample of production data is anomalous, the method may progress to discard operation 418.

At train operation 416, when the at least one sample is determined to be non-anomalous, the model for the non-anomalous VNF may be trained based on the at least one sample of production data.

At discard operation 418, when the at least one sample is determined to be anomalous, the at least one sample of production data may be discarded and the method may progress to end operation 422.

At detect operation 420, based on the trained model, an anomaly associated with the VNF may be detected at runtime at a RAN datacenter. That is, since the model is trained based on data (e.g., features) collected in non-anomalous cases (whether in a controlled environment or a production environment), the trained model may be used to detect anomalies by inferring the predicted output of the VNF given some new input. If a distance of the predicted output from the observed output is above a threshold for a window of data (e.g., last 20 collected points), this can be identified as an anomaly.

In aspects, the operations 410-418 may be associated with a second phase of training a model for VNF anomaly detection.

As should be appreciated, operations 402-422 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5:
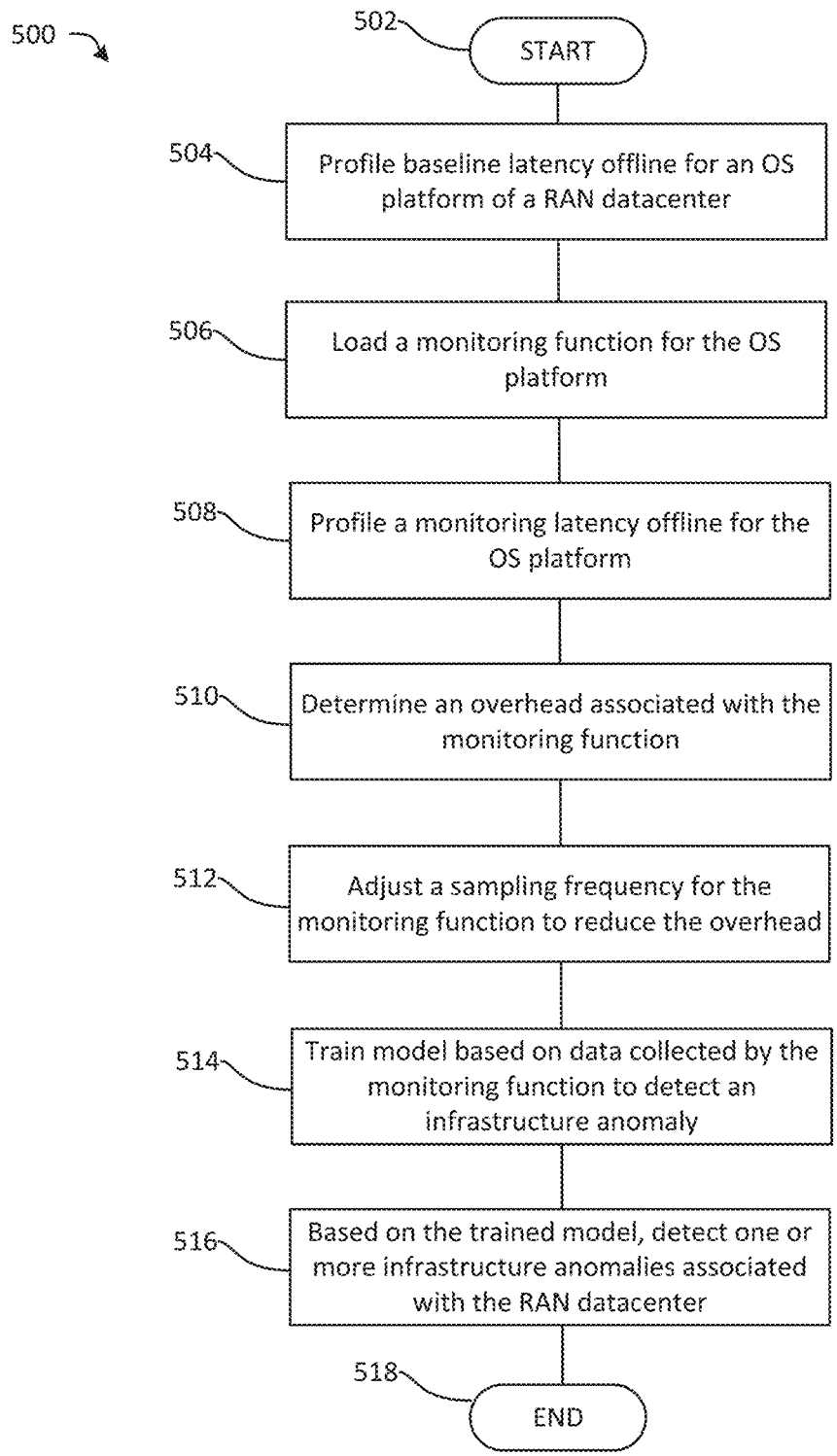
FIG. 5 illustrates an example method for detecting an anomaly associated with an infrastructure of a RAN datacenter in accordance with aspects of the present disclosure.

FIG. 5 illustrates an example method for detecting an anomaly associated with an infrastructure of a RAN datacenter in accordance with aspects of the present disclosure. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device.

Following start operation 502, at baseline scheduling latency operation 504, a baseline scheduling latency for an operating system (OS) platform of a RAN datacenter may be profiled offline. For example, the baseline scheduling latency of the OS platform can be monitored offline using platform tests, including the minimum, maximum and average baseline scheduling latency for each CPU core of the OS platform.

At load operation 506, at least one monitoring function may be loaded for the OS platform. For instance, the at least one monitoring function may monitor CPU scheduling latency, per process off-CPU times, cache reads/misses, or the like.

At monitoring scheduling latency operation 508, a monitoring scheduling latency for the OS platform of the RAN datacenter may be profiled offline. For instance, the monitoring scheduling latency of the OS platform (while loaded with the monitoring function) can be measured offline using platform tests, including measuring the minimum, maximum and average scheduling latency for each CPU core of the OS platform. In this case, the measurements include the overhead introduced by the at least one monitoring function.

At determine operation 510, an overhead associated with the at least one monitoring function may be determined. For instance, the overhead may be the difference between the baseline scheduling latency and the monitoring scheduling latency.

At adjust operation 512, a sampling frequency for the at least one monitoring function may be adjusted to reduce the overhead. For instance, the sampling frequency may be adjusted for the at least one monitoring function (1 out of every N events) to ensure that the total scheduling latency overhead from the introduction of monitoring functions remains below a threshold. The sampling frequency of the at least one monitoring function can be adjusted so that the average scheduling latency per CPU core does not increase by more than 10% compared to the non-monitoring case. In this case, the scheduling latency is the sum of the baseline scheduling latency plus the sampling overhead for collecting 1/N samples, which is reduced proportionally as compared to the monitoring scheduling latency to the sampling frequency.

At training operation 514, a model for detecting infrastructure anomalies may be trained based on data collected by the at least one monitoring function in a production environment. For instance, the monitoring function may collect training data associated with resources including the NIC, switch packet counters (e.g., packet losses, number of packets, etc.), CPU core utilization, number of interrupts, kernel lock latency, per-thread VNF stats (CPU scheduling latency, CPU on-off times, context switches, cache miss ratio, DRAM accesses, etc.). In aspects, an unsupervised time-series anomaly detection approach may use generative models (e.g., an auto-encoder), methods for time-series prediction, etc., to train an infrastructure anomaly model online at the production network.

At detect operation 516, based on the trained model, one or more infrastructure anomalies associated with the RAN datacenter may be detected. In aspects, an infrastructure anomaly may be detected based on the trained model by inferring non-anomalous events of a resource monitored by the at least one monitoring function. If a distance of the predicted event from the observed event is above a threshold, this can be identified as an infrastructure anomaly.

As should be appreciated, operations 502-518 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
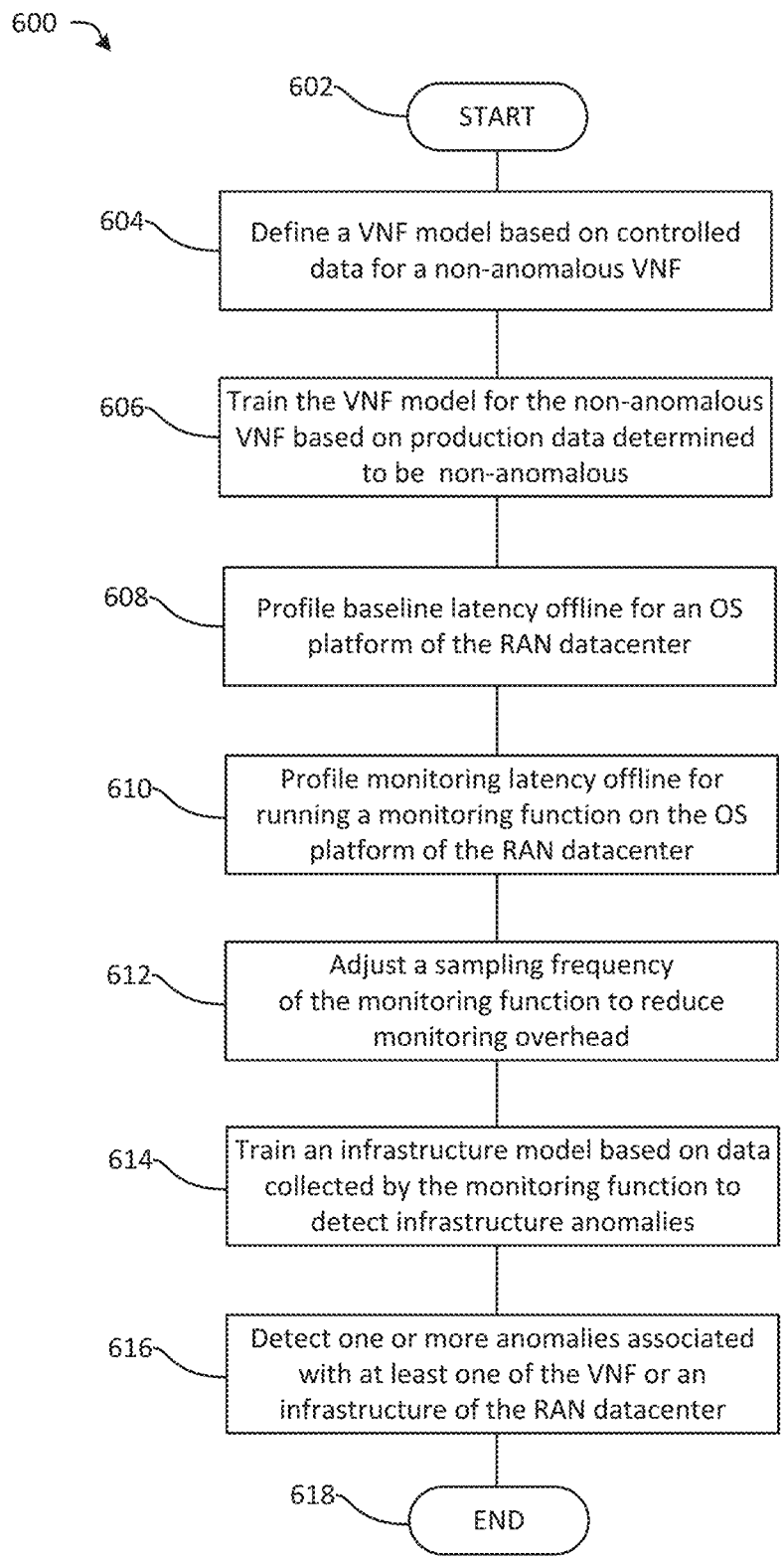
FIG. 6 illustrates an example method for detecting anomalies associated with a VNF and/or a resource of a RAN datacenter in accordance with aspects of the present disclosure.

FIG. 6 illustrates an example method for detecting anomalies associated with a VNF and/or a resource of a RAN datacenter in accordance with aspects of the present disclosure. A general order of the operations for the method 600 is shown in FIG. 6. Generally, the method 600 begins with start operation 602 and ends with end operation 618. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device.

Following start operation 602, at define VNF operation 604, a VNF model for a non-anomalous VNF may be defined based on controlled data collected for a RAN datacenter. For instance, each VNF can be viewed as a finite state machine that takes certain inputs and, given its state, produces certain probabilistic outputs. Using the controlled data, learning techniques can be applied to predict the behavior of the VNF for non-anomalous cases. Such learning techniques could include supervised learning, where the model is fit to predict the VNF's output given its input and state, or unsupervised learning, such as generative models (e.g., auto-encoders), where the VNF's input, output, and state are used as input training features.

At train VNF operation 606, the VNF model for the non-anomalous VNF may be trained based on production data collected for the RAN datacenter. As described above, in the production environment there is no guarantee that anomalies are not present. In a first aspect, samples of the production data can be used as input to the existing VNF model to infer whether each sample of production data is anomalous or not. When the existing VNF model predicts with high certainty that the percentage of non-anomalous data in a sample is above a threshold (e.g., 60%), all production data in that sample can be treated as non-anomalous and can be used to further train the VNF model. In a second aspect, the production data may be manually marked offline by domain experts as non-anomalous and the VNF model may be retrained with the modified production data.

At profile baseline scheduling latency operation 608, a baseline scheduling latency for an operating system (OS) platform of the RAN datacenter may be profiled offline. For example, the baseline scheduling latency of the OS platform can be monitored offline using platform tests, including the minimum, maximum and average baseline scheduling latency for each CPU core of the OS platform.

At profile monitoring scheduling latency operation 610, a monitoring scheduling latency associated with running one or more monitoring functions on the OS platform of the RAN datacenter may be profiled offline. For instance, the monitoring scheduling latency of the OS platform loaded with the monitoring function can be measured offline using platform tests, including measuring the minimum, maximum and average scheduling latency for each CPU core of the OS platform. In this case, the measurements include the overhead introduced by the at least one monitoring function.

At adjust operation 612, a sampling frequency for at least one monitoring function may be adjusted to reduce an overhead associated with monitoring an infrastructure of the RAN datacenter. For instance, the sampling frequency may be adjusted for the at least one monitoring function (1 out of every N events) to ensure that the total scheduling latency overhead from the introduction of monitoring functions remains below a threshold. The sampling frequency of the at least one monitoring function can be adjusted so that the average scheduling latency per CPU core does not increase by more than 10% compared to the non-monitoring case. In this case, the scheduling latency is the sum of the baseline scheduling latency plus the sampling overhead for collecting 1/N samples, which is reduced proportionally as compared to the monitoring scheduling latency to the sampling frequency.

At training operation 614, an infrastructure model for detecting infrastructure anomalies may be trained based on data collected by the at least one monitoring function in a production environment. For instance, the monitoring function may collect training data associated with resources including the NIC, switch packet counters (e.g., packet losses, number of packets, etc.), CPU core utilization, number of interrupts, kernel lock latency, per-thread VNF stats (CPU scheduling latency, CPU on-off times, context switches, cache miss ratio, DRAM accesses, etc.). In aspects, an unsupervised time-series anomaly detection approach may use generative models (e.g. autoencoder) to train the infrastructure model online at the production network.

At detect operation 616, one or more anomalies associated with at least one of a VNF or an infrastructure of the RAN datacenter may be detected. For instance, based on the trained VNF model, a VNF anomaly may be detected by inferring the predicted output of the VNF given some new input. If a distance of the predicted output from the observed output is above a threshold for a window of data (e.g., last 20 collected points), this can be identified as a VNF anomaly. Additionally or alternatively, an infrastructure anomaly may be detected based on the trained infrastructure model by inferring non-anomalous events of a resource monitored by the at least one monitoring function. If a distance of the predicted event from the observed event is above a threshold, this can be identified as an infrastructure anomaly. Similarly, if a distance of a predicted window of data from an observed window of data for a monitored resource is above a threshold, the observed window of data for the monitored resource can be identified as anomalous.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
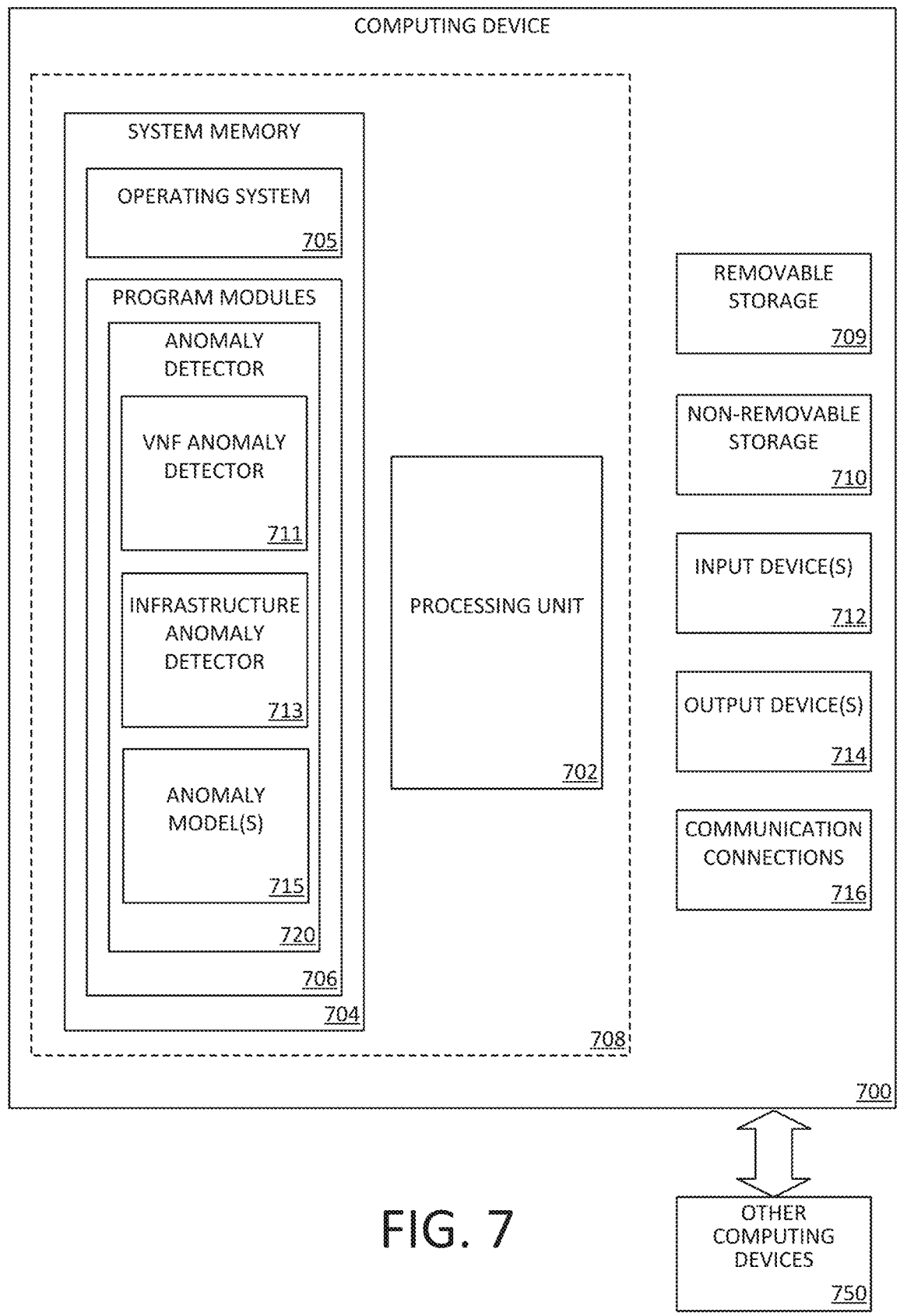
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing anomaly detector 720 on a computing device (e.g., a server 116 of far-edge datacenter 110), including computer executable instructions for the anomaly detector 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running anomaly detector 720, such as one or more components and, in particular, VNF anomaly detector 711, infrastructure anomaly detector 713, and/or anomaly model(s) 715.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., anomaly detector 720) may perform processes including, but not limited to, the aspects, as described herein. Other program modules that may be used in accordance with aspects of the present disclosure, and in particular for performing anomaly detection in a far-edge datacenter of a RAN, may include VNF anomaly detector 711, infrastructure anomaly detector 713, anomaly model(s) 715, and the like.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
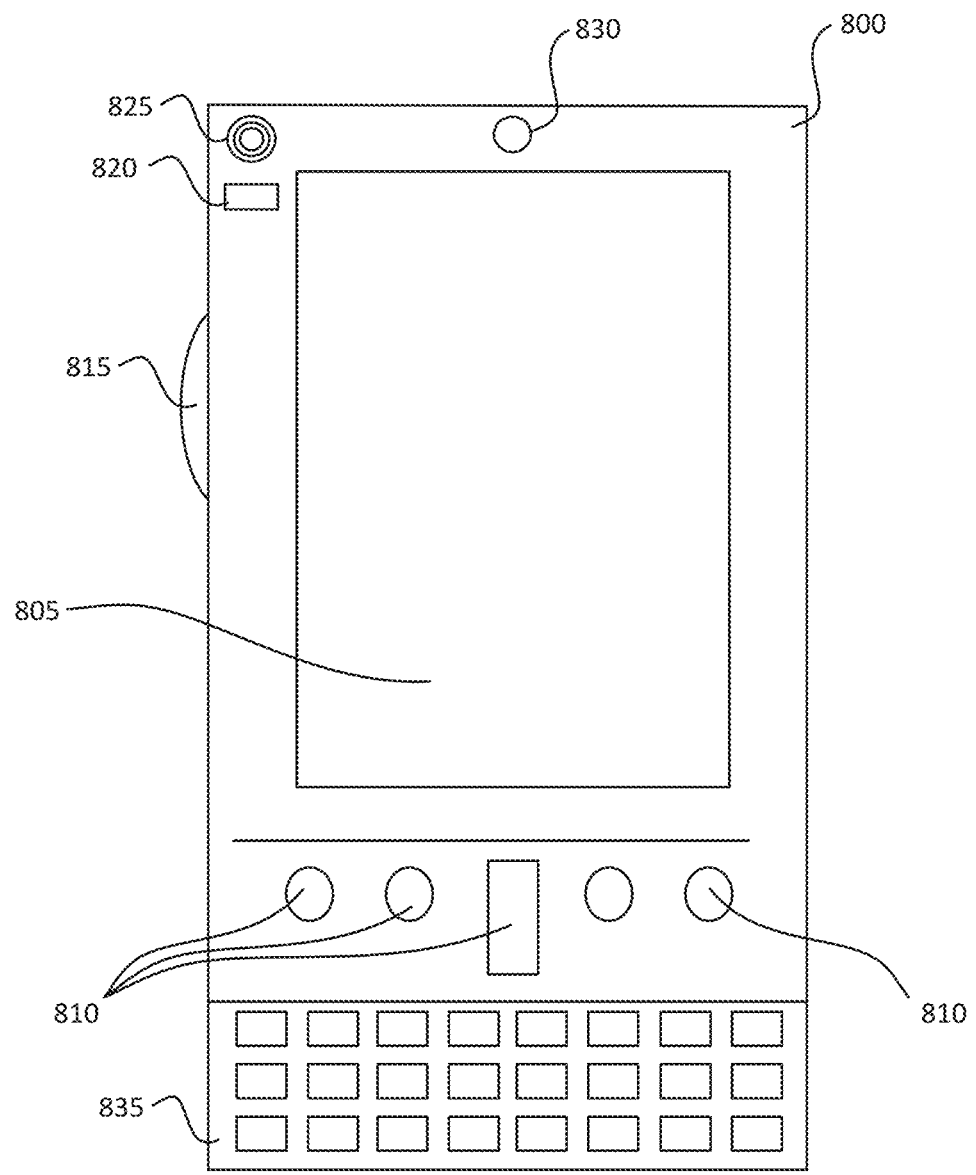
FIG. 8A is a simplified diagram of a mobile computing device with which aspects of the present disclosure may be practiced.
Figure 8B:
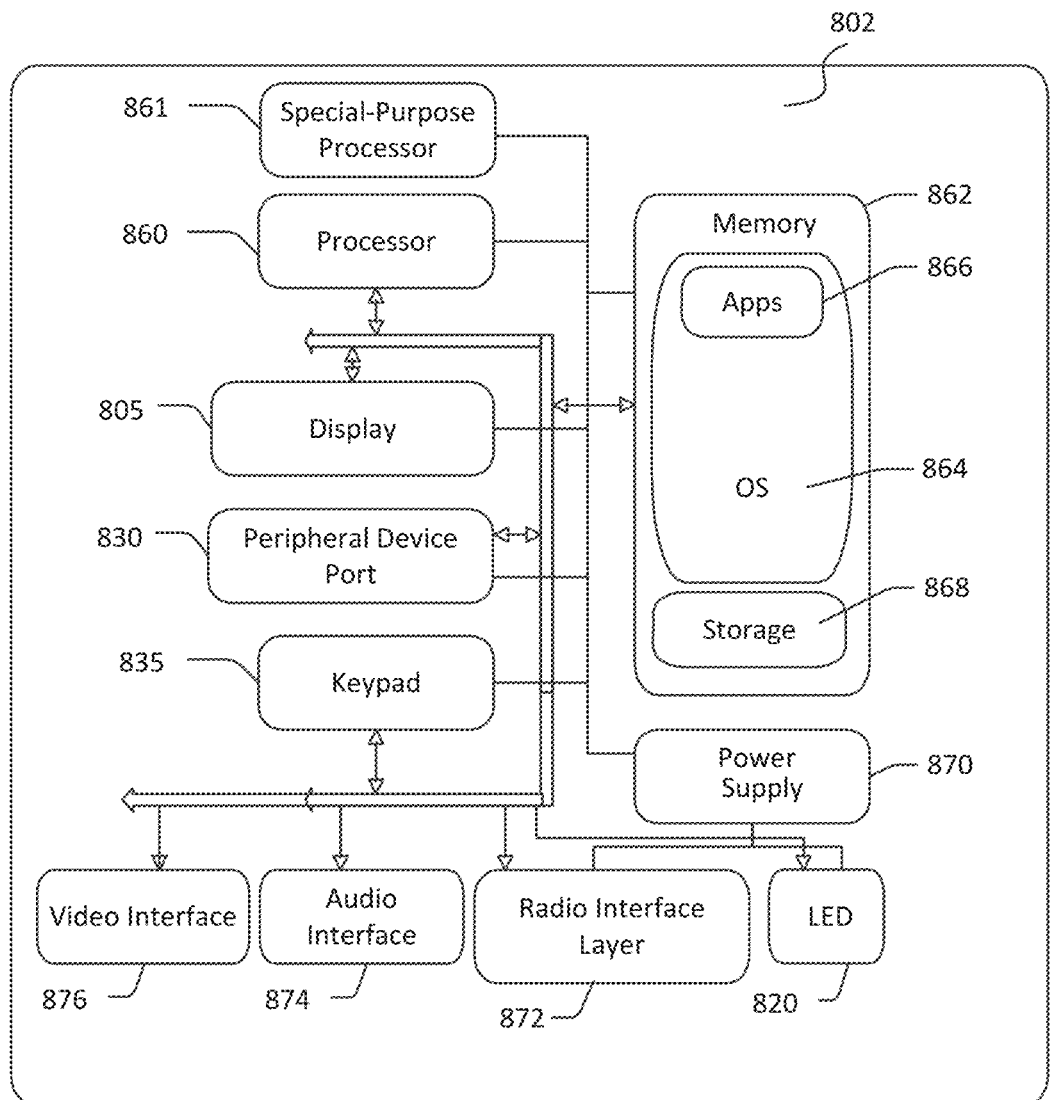
FIG. 8B is another simplified block diagram of a mobile computing device with which aspects of the present disclosure may be practiced.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications. In some aspects, the system 802 is integrated as a computing device, such as an integrated personal digital assistant (PDA) and wireless phone.

One or more application programs 866 may be loaded into the memory 862 and run on or in association with the operating system 864. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for implementing an anomaly detector as described herein (e.g., a VNF anomaly detector, infrastructure anomaly detector, anomaly model(s), and the like).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for anomaly detection in a RAN environment, according to at least the examples provided in the sections below.

In another aspect, a method for detecting anomalies in a radio access network (RAN) is provided. The method includes profiling a baseline scheduling latency offline for an operating system (OS) platform of a RAN datacenter, loading at least one monitoring function for the OS platform, and profiling a monitoring scheduling latency offline for the operating system (OS) platform loaded with the at least one monitoring function. Additionally, the method includes determining an overhead associated with the at least one monitoring function, where the overhead is a difference between the baseline scheduling latency and the monitoring scheduling latency; and adjusting a sampling frequency for the at least one monitoring function to reduce the overhead. Based on data collected by the at least one monitoring function, the method includes training a model to detect an anomaly associated with an infrastructure of the RAN datacenter and, based on the trained model, detecting one or more anomalies associated with the infrastructure of the RAN datacenter.

In yet another aspect, a method for detecting anomalies in a radio access network (RAN) is provided. The method includes collecting controlled data associated with a virtualized network function (VNF) in a controlled environment, wherein the VNF is non-anomalous in the controlled environment and, based on the controlled data, defining a model for the non-anomalous VNF including a set of inputs and a set of probabilistic outputs. The method further includes collecting at least one sample of production data associated with the VNF in a production environment of a RAN datacenter, where the VNF is one of anomalous or non-anomalous in the production environment, and determining that the at least one sample of production data is associated with the non-anomalous VNF when the model predicts that the at least one sample of production data includes a percentage of non-anomalous data above a threshold percentage. When the at least one sample of production data is associated with the non-anomalous VNF, the method includes training the model with the at least one sample of production data and, based on the trained model, detecting an anomaly associated with the VNF during runtime in the RAN datacenter, where the anomaly is associated with an observed output that differs from a probabilistic output of the trained model by more than a threshold amount.

Any of the one or more above aspects in combination with any other of the one or more aspect. Any of the one or more aspects as described herein.

What is claimed is:

1. A system comprising:
    at least one processor; and
    memory storing instructions that, when executed by the at least one processor, cause the system to perform operations for anomaly detection in a radio access network (RAN), the operations comprising:
        collecting controlled data associated with a virtualized network function (VNF) in a controlled environment of a RAN datacenter, wherein the VNF is non-anomalous in the controlled environment;
        based on the controlled data, defining a model for a non-anomalous VNF, wherein the model receives event data of the non-anomalous VNF as input and predicts whether the event data as a non-anomalous event according to a set of probabilistic data as output;
        collecting a sample of production data associated with the VNF in a production environment of a RAN datacenter, wherein the VNF is one of anomalous or non-anomalous in the production environment;
        based on the defined model, determining whether the sample of production data represents the event data of the non-anomalous VNF;
        when the sample of production data represents the non-anomalous VNF, training the model with the sample of production data; and
        based on the trained model, detecting an anomaly of the VNF during runtime in the RAN datacenter, wherein the anomaly represents a condition of is an observed output, and a value of the observed output differs from a probabilistic output of the trained model by more than a threshold amount.

2. The system of claim 1, wherein the sample of production data is associated with the non-anomalous VNF when the model predicts that the at least one sample of production data includes a percentage of non-anomalous data above a threshold percentage.

3. The system of claim 1, wherein the sample of production data is collected during a window of time.

4. The system of claim 1, the instructions when executed causing the system to perform further operations, comprising:
    selecting one or more features of the VNF; and
    defining the model for the non-anomalous VNF based on the selected one or more features of the VNF.

5. The system of claim 4, the instructions when executed causing the system to perform further operations, comprising:
    limiting a first monitoring overhead for training the model by collecting the sample of production data for the selected one or more features of the VNF.

6. The system of claim 4, the instructions when executed causing the system to perform further operations, comprising:
    limiting a second monitoring overhead for detecting VNF anomalies during runtime by monitoring the selected one or more features of the VNF.

7. The system of claim 1, wherein the observed output is an observed window of outputs.

8. The system of claim 1, wherein the sample of production data is associated with an anomalous VNF when the model predicts that the sample of production data includes a percentage of non-anomalous data below a threshold percentage.

9. The system of claim 8, the instructions when executed causing the system to perform further operations, comprising:
    discarding the sample of production data.

10. A method for detecting anomalies in a radio access network (RAN), comprising:
    collecting controlled data associated with a virtualized network function (VNF) in a controlled environment, wherein the VNF is a non-anomalous VNF in the controlled environment;
    based on the controlled data, defining a model for the non-anomalous VNF, wherein the model receives event data of the non-anomalous VNF as input and predicts whether the event data as anon-anomalous event according to a set of probabilistic data as output;
    collecting a sample of production data associated with the VNF in a production environment of a RAN datacenter, wherein the VNF is one of anomalous or non-anomalous in the production environment;
    determining that the sample of production data represents the event data of the non-anomalous VNF when the model predicts that the at least one sample of production data includes a percentage of non-anomalous data above a threshold percentage;

when the sample of production data represents the non-anomalous VNF, training the model with the sample of production data; and based on the trained model, detecting an anomaly of the VNF during runtime in the RAN datacenter, wherein the anomaly represents a condition of an observed output, and a value of the observed output differs from a probabilistic output of the trained model by more than a threshold amount.

11. The method of claim 10, further comprising:
selecting one or more features of the VNF; and
defining the model for the non-anomalous VNF based on the selected one or more features of the VNF.

12. The method of claim 11, wherein a monitoring overhead is reduced by monitoring the selected one or more features of the VNF.

13. The method of claim 10, wherein the model is trained based on learning techniques, and wherein the learning techniques comprise supervised learning or unsupervised learning.

14. The method of claim 10, further comprising:
determining that the sample of production data is associated with an anomalous VNF when the model predicts that the sample of production data includes a percentage of non-anomalous data below a threshold percentage.

15. The method of claim 14, further comprising:
discarding the sample of production data.

16. The method of claim 10, wherein defining the model for the non-anomalous VNF comprises defining the VNF as a finite state machine.

* * * * *